Patented Jan. 25, 1944

2,340,128

UNITED STATES PATENT OFFICE 2,340,128

LIME TREATMENT OF SUGAR LIQUORS

Robert D. Kent, Evanston, Ill., assignor to The Dicalite Company, Los Angeles, Calif., a corporation of Nevada No Drawing. Application January 2, 1942, Serial No. 425,432

5 Claims. (Cl. 127—50)

An object of the invention is to decrease the consumption of lime used in defecating sugar liquors by substituting for the greater part of the lime dose customarily used a relatively small quantity of a diatomaceous earth filter-aid.

An object of the invention is to avoid the necessity for the so-called "first carbonation" of the lime-treated sugar liquor, a step which is required with the lime doses now ordinarily used.

A further object of the invention is to improve the color and purity of the limed sugar liquor by avoiding the reversion of color which sometimes follows the application thereto of considerable amounts of carbon dioxide.

A further object of the invention is to reduce the load on the filtering equipment used for clarifying the sugar liquor by reducing the volume of the "mud" resulting from the addition thereto of solids such as lime.

A further object of the invention is to increase the purity of the limed juice by introducing a step of defecation with lime and filter-aid ahead of the conventional step or steps of liming and carbonation.

A further object of the invention is to reduce the loss of sugar due to retention in the filter cake, and also the time required for sweetening off, by substituting a highly permeable filter-aid cake for the customary calcium carbonate cake in at least one step in the process.

The process is particularly adapted to the handling of raw beet juice and is described in that connection herein, though it should not be considered as limited to beet juice but is applicable to any sugar solution which is susceptible to defecation by the conventional lime treatment.

A generalized description of the conventional lime treatment, set forth as a background for pointing out the novelty in applicant's method, is as follows:

The raw juice, which is usually or always on the acid side, is first heated to a relatively high temperature, of the order of 80° centigrade. To the hot juice is then added a suitable quantity of calcium hydroxide in the form of milk of lime, which is thoroughly disseminated throughout the juice.

The lime dosage required in present practice varies with the characteristics of the juice and to some extent with the details of manipulation. In extreme cases it may be as low as 1.6% but is more often of the order of 2.5%, and about 2.25% may be considered average practice. It is customary to express lime dosages in terms of calcium oxide, CaO, and to refer percentages to the weight of beets from which the juice is prepared. The same custom is followed herein.

The addition of this quantity of lime raises the pH of the juice to a high value, of the order of 10.5. The highly alkaline limed juice is then blown with carbon dioxide, more or less diluted with nitrogen, until the greater part of the lime is converted to the form of the carbonate, $CaCO_3$, and the pH is considerably reduced, to a value of the order of 9.0 to 9.4. This step is generally known as "first carbonation." The carbonated juice is then filtered, large quantities of "mud" consisting substantially of calcium carbonate accumulating in the filter presses. The presses are then sweetened off by passing dilute sugar liquor or water through the cake to displace the retained sugar.

The filtered juice is then again dosed with milk of lime in quantity equal to perhaps 0.25% CaO, and is again carbonated, this time to a considerably lower pH value, of the order of 8.0. This treatment is termed "second carbonation" and is followed by a second filtration to remove calcium carbonate.

These treatments have for their objects the clarification and defecation of the juice, its partial decolorization, and the preparation of the juice for subsequent steps of sulphitation and evaporation with which we are not here concerned.

The applicant departs from the conventional procedure in eliminating the first carbonation, by reducing the lime dosage in the first step to the relatively small quantity (of the order of 0.3%) required to bring the juice to the pH to which, in the present method, it would be brought at the end of the carbon dioxide treatment. As this reduction of the lime dosage reduces the filterability of the limed juice, a small quantity of a diatomaceous earth filter-aid is added prior to filtration. This dose may be of the order of 0.25%, to produce a flow-rate approximately equal to that obtained with the large dose of lime of the present practice, or it may be increased to 0.5% or more if it is desired to materially improve the flow-rate through the filters.

The applicant also departs from the present practice in the manipulation of temperature of the juice, as will be described.

The preferred procedure in the new method is as follows. The juice, instead of being initially heated, is dosed with milk of lime at its prevailing temperature which preferably should not exceed 40° C., and after mixing is allowed to stand for a short time to produce flocculation. After this change has occurred the juice is heated to about 80° C. and a suitable quantity of a high-grade diatomaceous earth filter-aid is added and intermixed. The liquor is then filtered and the presses sweetened off in the usual manner.

The lime dosage, figured as CaO on weight of beets, may range from 0.2% to 0.6%, but 0.3% is usually sufficient. The dosage of filter-aid may range from 0.2% to 0.5%, but 0.25% is usually sufficient to maintain the established flow-rate of the filters.

This treatment is a substitute for the first carbonation only of the present practice, and the second carbonation and subsequent steps of the conventional method may be applied following it.

As an example of the working of the improved process certain experiments were made, the results of which are set forth in tabular form below. In the first set of experiments the raw beet juice had the following characteristics:

Brix on raw juice_____degrees__ 16.2
Purity _____per cent__ 82.1
Specific gravity of juice_____ 1.07
Sugar content of beets_____per cent__ 19.0

The juice was first divided into two portions, of which the smaller was first heated to 80° C., at which temperature its pH value was 5.7, using the hot electrode of the Beckman apparatus. This portion of the juice was then treated at 80° C. with the customary dose of 2.25% CaO in the form of milk of lime prepared by slaking quicklime with a small portion of the juice to form a thick cream. This addition brought the pH value of the juice to 10.2. The limed juice was then blown with gaseous carbon dioxide in the customary manner until its pH value was brought back to 9.2, that being the optimum figure at which the palest juice color was obtained.

The other and larger portion of the juice was then treated, without heating, with 0.4% of lime in the form of cream of lime, this dose bringing the pH (at 80° C.) of the limed and uncarbonated juice to 9.2. After this treatment the limed juice was heated to 80° C. and divided into six portions which were filtered with the addition of various proportions of a high grade diatomaceous earth filter-aid ("Dicalite 4200" grade). A sample of the limed and carbonated juice was also filtered without the addition of the filter-aid, as in present practice, to afford a standard for flow-rate comparisons.

All of these filtrations were made under identical conditions of time, temperature and pressure and, with one exception, were made through uncoated standard filter cloth. The single exception is the filtration of test G, in which no filter-aid was added to the juice but a precoat of 10# of filter-aid per square foot was applied to the cloth. The results of these filtrations are shown in the table immediately below:

TABLE 1

| Test No. | Lime as CaO | Filteraid | pH after liming | pH after carbonation | Flow rate |
|---|---|---|---|---|---|
| | Per cent | Per cent | | | |
| A | 2.25 | None | 10.2 | 9.2 | 1.00 |
| B | 0.40 | None | 9.2 | | 0.85 |
| C | 0.40 | 0.25 | 9.2 | | 1.09 |
| D | 0.40 | 0.50 | 9.2 | | 1.17 |
| E | 0.40 | 0.75 | 9.2 | | 1.38 |
| F | 0.40 | 1.00 | 9.2 | | 1.80 |
| G | 0.40 | (1) | 9.2 | | 0.82 |

[1] Precoat.

The filtrate from test A was satisfactorily clear; that from test B, which showed a reasonably satisfactory flow-rate, was not commercially clear. The filtrates from the remaining tests were brilliant. In this instance the colors of the effluents which were not carbonated were materially better than that of the effluent from test A in which the pH was reduced by carbonation.

It was anticipated that the omission of the treatment with carbon dioxide might leave the filtered juice heavily charged with soluble lime salts. This proved not to be the case, as is shown by the results of the experiments tabulated below. In these tests two samples of raw beet juice were used, having the following characteristics:

| | Sample | |
|---|---|---|
| | No. 1 | No. 2 |
| Brix on raw juice_____degrees__ | 13.7 | 13.3 |
| Purity_____per cent__ | 80.6 | 80.7 |
| Sugar content of beets_____do____ | 15.4 | 10.7 |
| pH of raw juice at 80° C_____ | 5.8 | 5.7 |

These samples were treated with lime in the manner above described, using the proportions of lime and filter-aid noted in Table 2 below. After filtration the lime content of each sample was determined and calculated back to percentage of calcium oxide on the actual sugar content of the juice. The filter-aid used in these tests was "Dicalite Speedplus," a slightly less open grade than the "4200" grade used in the first series of tests.

TABLE 2

| Test No. | Raw juice | Lime as CaO | Filteraid | pH after liming | pH after carbonation | CaO on sugar |
|---|---|---|---|---|---|---|
| | | Per cent | Per cent | | | Per cent |
| H | No. 1 | 2.25 | None | 10.6 | 9.2 | 0.45 |
| I | No. 1 | 0.40 | 0.5 | 9.6 | | 0.71 |
| J | No. 1 | 0.40 | 1.0 | 9.6 | | 0.65 |
| K | No. 2 | 2.25 | None | 10.5 | 9.9 | 0.76 |
| L | No. 2 | 0.28 | 0.5 | 9.2 | | 0.81 |
| M | No. 2 | 0.40 | 1.0 | 9.9 | | 0.90 |

The same beet juices, when limed to 2.25% and carbonated back to about pH 9.9 in the regular operation of the sugar house from which the juices were obtained, showed lime contents of 0.66% and 0.78% respectively. These figures show that the omission of the carbon dioxide treatment, when coupled with the substitution of the greater part of the lime dose by a small amount of filter-aid, has only an immaterial effect on the final lime content of the juice.

Another series of tests was made using the juice from Utah beets and comparing the flow-rate of samples withdrawn from the factory carbonation tanks with that of samples of the same raw juice treated by the method above described. The test filters were operated at 40 lbs. pressure and at 75° C. The results appear in Table 3 below:

TABLE 3

| Method | Lime as CaO | Filter-aid | Flowrate | | |
|---|---|---|---|---|---|
| | | | Sample No. 3 | Sample No. 4 | Sample No. 5 |
| | Per cent | Per cent | | | |
| Conventional | 2.5 | None | 1.00 | 1.00 | 1.00 |
| Improved | 0.3 | None | 0.64 | 0.67 | 0.73 |
| Do | 0.3 | 0.25 | 1.11 | 0.92 | 1.28 |
| Do | 0.3 | 0.50 | 1.20 | 1.12 | 1.64 |
| Do | 0.3 | 0.75 | | | 3.75 |
| Do | 0.3 | 1.00 | 3.10 | | 4.46 |

When operating at the temperatures above described, i. e., when adding the lime at a relatively low temperature (below 40° C.) and heating only after this addition, the above 0.3% of lime with 0.25% of filter-aid gave filtered juice colors equal to those obtained in the conventional method with 2.0 to 2.5% of lime.

In parallel experiments in which the juice was heated to 75° C. before adding the lime, a lime dose of 0.5% was required to obtain the same pale colors and the flow-rates, with equal dosages of filter-aid, dropped to about one-third of the rates shown in the table above. These experiments indicate the importance of adding the lime to the juice at the lowest feasible temperature, and in any case before passage through the juice heaters.

It will be understood that the applicant's variation from the conventional practice is in the first stage only on the lime treatment, the stage which corresponds to the "first carbonation" of the present art. The so-called "second carbonation" may desirably be applied to the filtered product from the above described treatment and may take any conventional or preferred form. For example, the filtered juice may be treated with more or less 0.25% lime and carbonated back to more or less pH 8.0, or otherwise in the judgment of the operator. When applied to the product of the new treatment, this second step appears to have the same effects as when applied to the product of the conventional "first carbonation."

If a juice of exceptional purity is more to be desired than the greatest economy of materials, a variant of the above procedure may be followed. In this modification the raw juice is dosed, in the cold, with the optimum quantity of lime which, depending on the characteristics of the raw juice, may be as much as 1% CaO on the weight of beets. The juice is then mixed with a quantity of filter-aid sufficient to give the required flow-rate and clarity, usually about 0.25%. The juice is then heated and filtered, without carbonation. To the filtrate is added a second dose of lime greater than that customary in second carbonation, up to about 1%, and the limed juice is carbonated down to the desired pH value and is finally filtered.

This modification obviously does not effect the economy of lime which results from the use of the dosages first described, but produces a juice of the highest quality.

The effects of lime and of carbon dioxide on the color of raw beet juice (a rough measure of the degree of defecation produced by the treatment) are somewhat variable, but in some instances the color of the product obtained by liming directly to the desired pH value is materially better than that obtained by the use of a larger dose of lime followed by carbonation back to the desired pH value.

In an experiment made with the juice from Imperial Valley beets (the juice used in the filtration experiments shown in Table 1) it was noted that as the dosage of lime was increased the color of the filtrate became paler up to about pH 9.2 and then progressively darkened. When the juice was limed initially to pH 10.2 (using 2.25% of lime) and then carbonated back, the lightest color was obtained at about the same pH value (9.2) but this lightest color was materially darker than the best color had with direct liming. Tables 4 and 5 below show the visual results of this comparison:

TABLE 4

*Progressive effect on color of liming a juice having originally a deep gray, almost black color and a pH value of 5.6. Changes in pH value due to successive increments of lime, no carbonation*

Test 11—pH 7.0—color almost unchanged
Test 12—pH 7.5—gray, shows tinge of yellow
Test 13—pH 8.5—lighter gray, more yellow tinge
Test 14—pH 9.0—light grayish yellow
Test 15—pH 9.2—light straw yellow
Test 16—pH 9.5—yellow, slightly darker than #15
Test 17—pH 9.7—yellow, darker than #16
Test 18—pH 10.0—yellow, darker than #17
Test 19—pH 10.2—yellow, darker than #18

TABLE 5

*Progressive effect on color of carbonating the same juice after treating with 2.25% lime to pH 10.2*

Test 21—pH 10.0—yellow, darker than #19
Test 22—pH 9.7—yellow, lighter than #21
Test 23—pH 9.5—yellow, lighter than #22
Test 24—pH 9.2—light yellow, matched #19
Test 25—pH 9.0—yellow brown, darker than #24
Test 26—pH 8.5—light brown
Test 27—pH 7.5—dark brown In a parallel experiment using the juice of beets from the vicinity of Anaheim, California, this color differential was not obtained. In this case the lightest color (60 microamps on the Holven-Gillett tyndallometer, 50 cm. cell) obtained by direct liming occurred at pH 10.0, while on carbonating back from pH 10.4 to pH 9.7 a slightly paler color (63 microamps) was observed.

The optimum dosage of lime employed in the improved process is that required to bring the juice, after filtration, to the desired color and purity without carbonation. This dose will vary with the initial acidity and relative purity of the raw juice and with the judgment of the operator as to the most favorable pH value at the end of the first stage treatment. It will seldom or never exceed one-quarter of the quantity now used, or about 0.6% of the weight of the beets from which the juice is made, or about 3.0% of the weight of sugar in the juice, and at the other end of the range the dose may be as low as one-third of the above quantities. If it is not desired to test each lot of juice in advance of the lime treatment, a dose of about 0.3% to 0.4% is recommended as giving good results in most cases.

The optimum dosage of filter-aid will depend on the specific characteristics of the earth used, on the temperature obtaining when the lime is added and on the rate of filtration desired. Ordinarily it is sufficient to equal the flow-rates of present practice and for this purpose a dose of from 0.2% to 0.3% of a high-grade earth will suffice, provided the lime has been added to the substantially cold juice. Inferior grades of earth will require correspondingly larger doses. Present filter capacities may be doubled or even quadrupled by increasing the earth dosage to say 1.0%. Clarification is not difficult and an open, free-filtering type of diatomaceous earth is to be preferred for this purpose. The earth has no known effect on the purity of the juice other than through the removal of suspensoids and therefore the minimum quantity of any given earth which suffices to produce a perfectly clear filtrate answers every purpose other than that of increasing the throughput capacity of an existing filter installation.

The essentials of the invention may best be pointed out by comparison of the new method with present practice in the individual steps involved.

*Lime dosage.*—The present art uses from 1.6% to 2.5% of lime (as CaO figured on beet weight) with average practice about 2.25%. The new method uses from 0.3% to 0.4% with the mean dosage about 0.35%.

*Temperature.*—Present practice is to heat the juice to 75°/80° C. before adding the lime. The new method produces its best results when the lime is added to a much cooler juice, preferably not above 40°, which is thereafter heated for filtration.

*Filteraid.*—None is used in present practice, the large excess of lime (in the final form of calcium carbonate) answering that purpose. The new method uses a minute quantity of a diatomaceous earth filteraid to replace this excess of lime.

*Carbonation.*—The present art utilizes a large quantity of carbon dioxide to precipitate the lime and render it filterable. The new method uses no carbon dioxide (in the first stage treatment).

The economics of the new method will be evident from the above comparison. Based on a ton of beets, present first stage carbonation, consumes (at an average of 2.25%) 45 pounds calcium oxide and 35 pounds net carbon dioxide, and produces 80 pounds (dry weight) of filter cake. The new method consumes (at an average of 0.35%) 7 pounds calcium oxide, no carbon dioxide and (at 0.25%) 5 pounds filteraid, and produces 12 pounds filter cake.

The use of the method herein described in lieu of the conventional "first carbonation" will be found advantageous in one or more of the following respects:

(a) In reducing the cost of solid materials, the filteraid required being usually less costly than the quantity of lime saved;

(b) In some instances, in an improved defecation and decolorization of the solution, resulting in a lowered burden on subsequent steps of purification;

(c) In avoiding the cost of and the time required for the present treatment with carbon dioxide;

(d) In reducing the burden on filtration equipment by greatly reducing the quantity of "mud" accumulating in the presses;

(e) In the possibility of materially increasing the throughout capacity of existing filtration systems;

(f) In sharply reducing the output of spent lime, which often constitutes a serious nuisance;

(g) In the possibility of producing, from any given raw juice, a purer treated juice than is possible with existing methods of lime treatment.

I claim as my invention:

1. The method of defecating a raw sugar-beet juice which consists in: treating the juice without substantial heating with a quantity of lime equivalent to from 0.2% to 0.6% CaO on weight of beets; clarifying the limed juice by filtering with a diatomaceous earth filter-aid at a materially increased temperature; treating the clarified juice with a second quantity of lime equivalent to from 0.2% to 0.6% CaO on weight of beets; blowing the second-limed juice with carbon dioxide until the lime is substantially converted to calcium carbonate, and filtering said calcium carbonate from the juice.

2. The method of defecating a raw sugar-beet juice which consists in: treating the juice at a relatively low temperature with a quantity of lime equivalent to from 0.2% to 0.6% CaO on weight of beets; clarifying the limed juice by filtering with a diatomaceous earth filter-aid at a temperature not substantially less than 75° centigrade; treating the clarified juice with a second quantity of lime equivalent to from 0.2% to 0.6% CaO on weight of beets; blowing the second-limed juice with carbon dioxide until the lime is substantially converted to calcium carbonate, and filtering said calcium carbonate from the juice.

3. The method of defecating a raw sugar-beet juice which consists in: treating the juice at a temperature not substantially exceeding 40° centigrade with a quantity of lime equivalent to from 0.2% to 0.6% CaO on weight of beets; clarifying the limed juice by filtering with a diatomaceous earth filter-aid at a temperature not substantially less than 75° centigrade; treating the clarified juice with a second quantity of lime equivalent to from 0.2% to 0.6% CaO on weight of beets; blowing the second-limed juice with carbon dioxide until the lime is substantially converted to calcium carbonate, and filtering said calcium carbonate from the juice.

4. The method of defecating a raw sugar-beet juice which consists in: treating the juice at a temperature not substantially exceeding 40° centigrade with a quantity of lime equivalent to from 0.2% to 0.6% CaO on weight of beets; clarifying the limed juice by filtering at a materially higher temperature with from 0.2% to 1.0% on weight of beets of a diatomaceous earth filter-aid; treating the clarified juice with a second quantity of lime equivalent to from 0.2% to 0.6% CaO on weight of beets; blowing the second-limed juice with carbon dioxide until the lime is substantially converted to calcium carbonate, and filtering said calcium carbonate from the juice.

5. The method of defecating a raw sugar-beet juice which consists in: treating the juice at a low temperature with lime until the palest color is reached and the hydrogen ion concentration of the juice is within the range pH 9.0 to pH 9.5; clarifying the limed juice by filtering at a materially higher temperature with a diatomaceous earth filter-aid; treating the clarified juice with a second quantity of lime equivalent to from 0.2% to 0.6% CaO on weight of beets; blowing the second-limed juice with carbon dioxide until the hydrogen ion concentration of said juice reaches approximately pH 8.0, and finally clarifying said juice by filtration.

ROBERT D. KENT.